Sept. 20, 1966  E. L. KEEDY  3,273,832
INFLATABLE PONTOON FOR AIRCRAFT
Filed Sept. 24, 1964  3 Sheets-Sheet 1
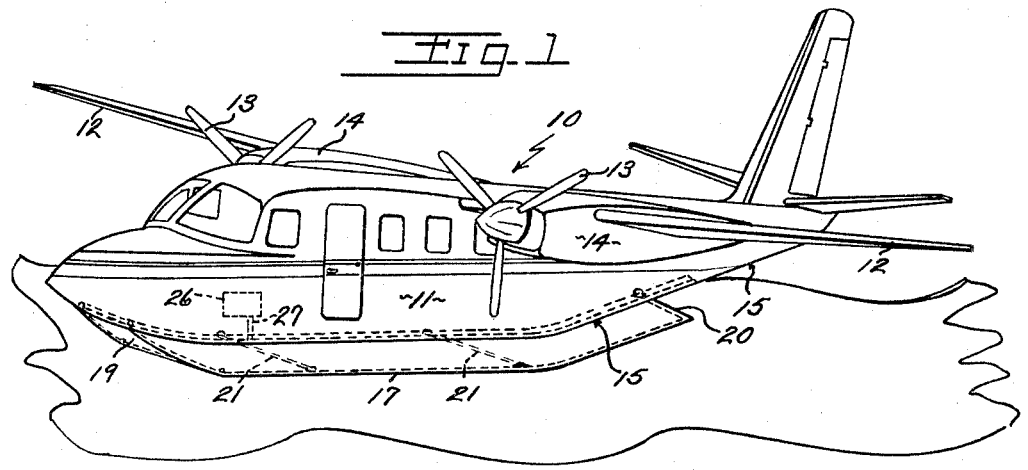
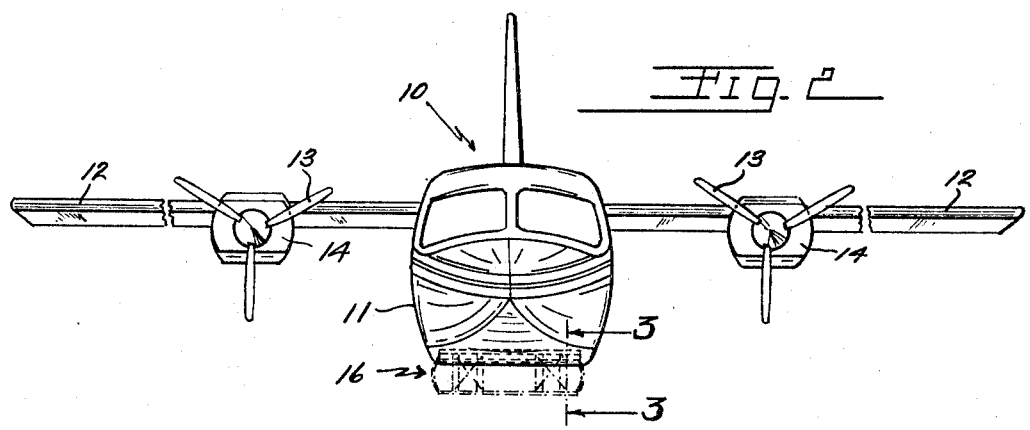
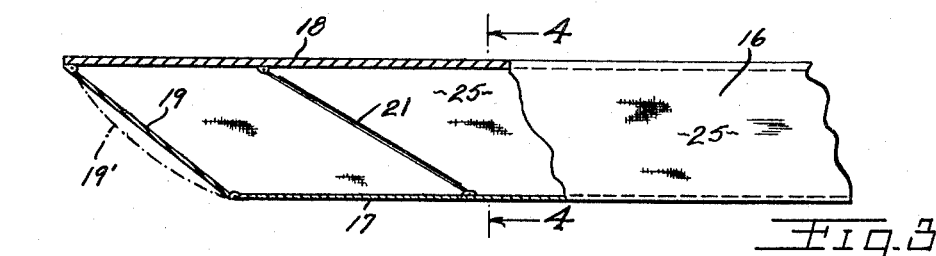
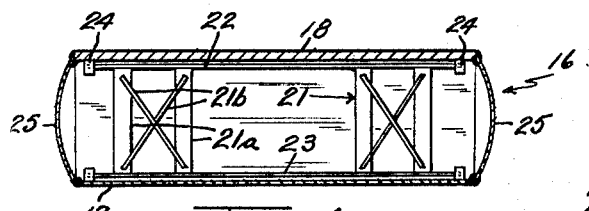
INVENTOR.
EDGAR L. KEEDY
BY
*Meyer, Baldwin, Doran & Egan*
ATTORNEYS Sept. 20, 1966  E. L. KEEDY  3,273,832
INFLATABLE PONTOON FOR AIRCRAFT
Filed Sept. 24, 1964  3 Sheets-Sheet 2
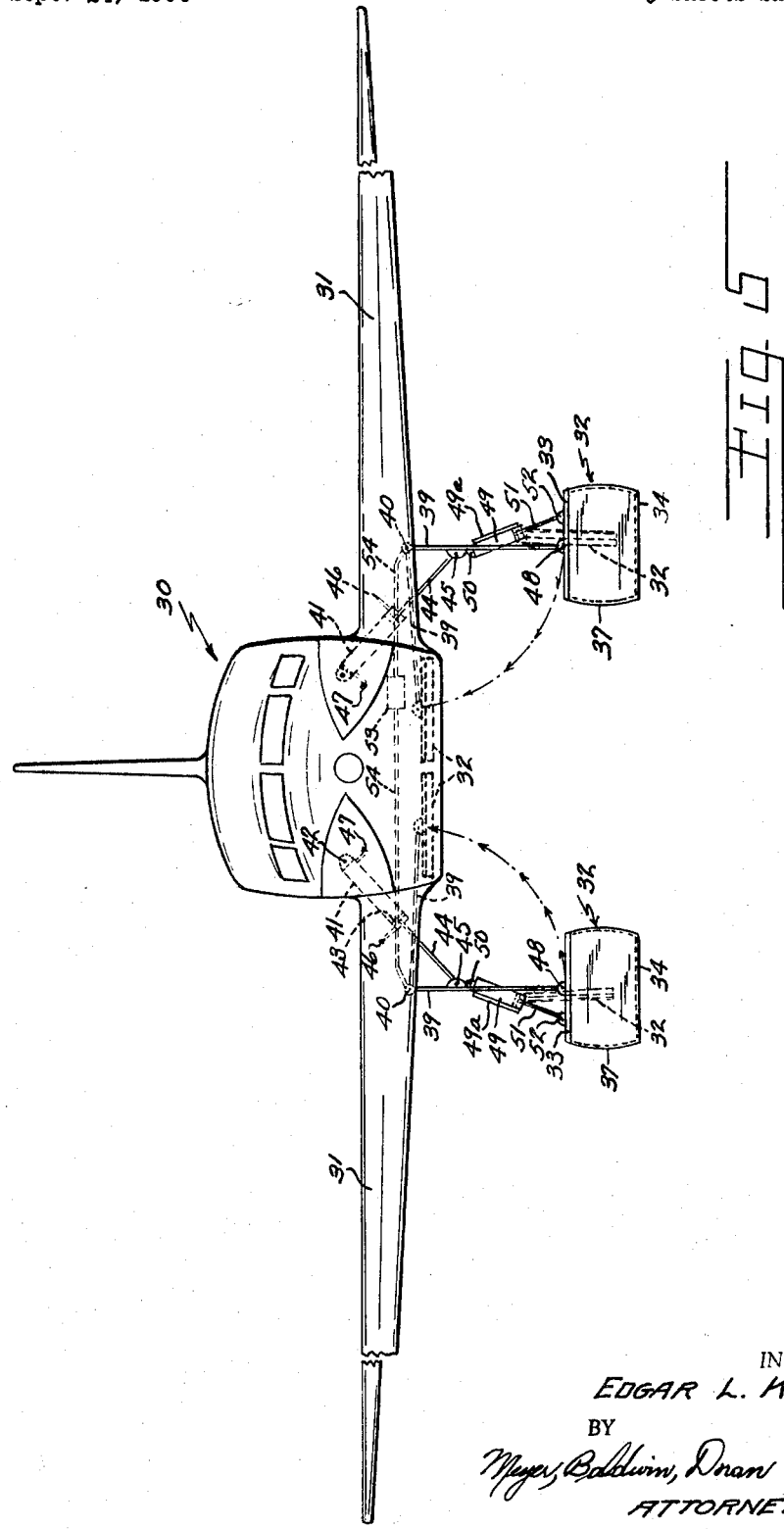
INVENTOR.
EDGAR L. KEEDY
BY
Meyer, Baldwin, Doran & Egan
ATTORNEYS Sept. 20, 1966   E. L. KEEDY   3,273,832
INFLATABLE PONTOON FOR AIRCRAFT
Filed Sept. 24, 1964   3 Sheets-Sheet 3
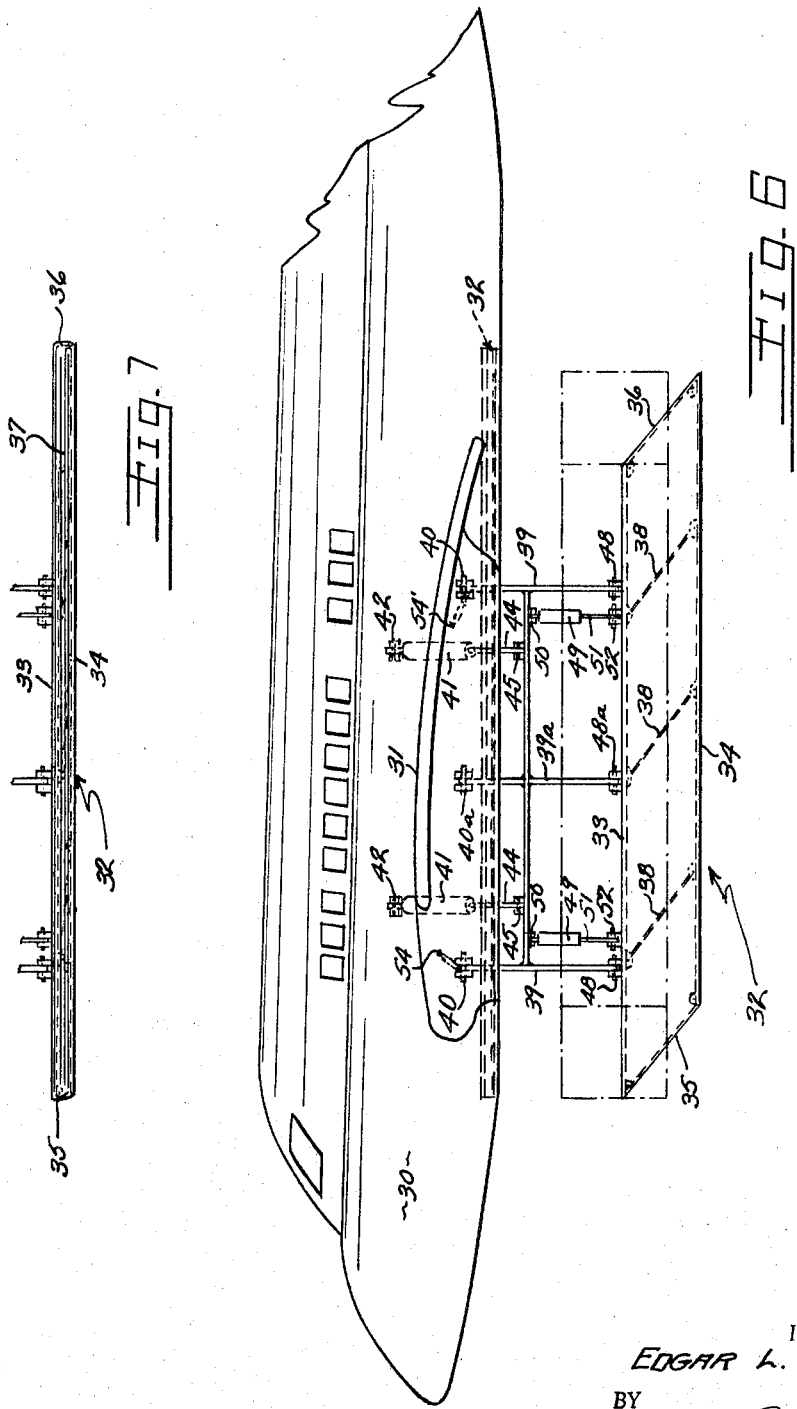
INVENTOR.
EDGAR L. KEEDY
BY
Meyer, Baldwin, Doran & Egan
ATTORNEYS united States Patent Office
3,273,832
Patented Sept. 20, 1966

3,273,832
INFLATABLE PONTOON FOR AIRCRAFT
Edgar L. Keedy, Rte. 1, Box 242, Woodstock Road,
Gates Mills, Ohio
Filed Sept. 24, 1964, Ser. No. 398,940
3 Claims. (Cl. 244—105)

This invention relates to improvements in an inflatable pontoon or hull for supporting aircraft on a water surface.

More specifically, this invention relates to a gas inflatable hull or pontoon having means connecting it with aircraft having an airfoil surface on the normally downwardly directed surface thereof. Means is provided for inflating the hull or pontoon and extending it into water engaging position spaced from the airfoil surface of the aircraft or vehicle, together with means for collapsing the hull or pontoon and retracting it to the airfoil surface with the parts being so constructed and arranged that in the collapsed and retracted condition the pontoon or hull has airfoil compatability with the airfoil surface so that the pontoon structure does not hamper the movement of the aircraft vehicle through the air when the pontoon is not in use.

Other objects and advantages of this invention will be apparent from the accompanying drawings and description and the essential features will be set forth in the appended claims.

In the drawings,

FIG. 1 is a perspective view of an airplane showing one form of the inflatable hollow pontoon of this invention in water engaging position below the fuselage of the aircraft;

FIG. 2 is a front elevational view of the device of FIG. 1;

FIG. 3 is a fragmental sectional view, enlarged, taken along the line 3—3 of FIG. 2 to more clearly show the construction of the inflatable hull or pontoon;

FIG. 4 is a fragmental sectional view taken along the line 4—4 of FIG. 3;

FIG. 5 is a front elevational view of another form of aircraft having the inflatable pontoons of this invention spaced one on each side of the fuselage of the airplane;

FIG. 6 is a side elevational view of the device of FIG. 5; while

FIG. 7 is a fragmental elevational view of the inflatable pontoon of FIG. 6 showing the same in a collapsed position.

Many airplanes, especially the smaller ones, would have greater usefulness if means could be provided for landing on water without interfering with the efficiency and maneuverability of the airplane in normal use. With this in mind, there is herein illustrated in FIGS. 1 and 2 a known type of aircraft 10 having a fuselage 11 with the wing 12 extending on opposite sides thereof and provided with any suitable means of propulsion such as the propellers 13 driven by engines in the cowling 14 in the usual manner. It should be understood that the plane is equipped with the usual controls and control surfaces of which further description is unnecessary here as they form no part of the present invention.

The fuselage 11 has an airfoil surface at 15 which is normally the underside thereof and is formed in the usual manner for the most efficient propulsion of the vehicle through the air. Beneath this airfoil surface the present invention provides a gas inflatable hull or pontoon 16 which is fluid tight and usually inflated by air to a pressure of about one pound per square inch above atmosphere. The lower surface of the hull 16 is of a ski type and substantially rigid as indicated at 17. The hull also has a top plate 18 substantially rigid and in most cases generally parallel to the bottom ski 17. The parts 17 and 18 would normally be constructed of strong, lightweight materials such as plywood, fiber glass reinforced plastic, aluminum or the like. The front and rear ends of the hull are closed at 19 and 20 preferably with rigid members pivotally connected to 17 and 18. For best results, these front and rear ends of the hull 16 are built for minimum air resistance as indicated in FIGS. 1 and 3. The planar surface indicated at 19 in FIG. 3 will perform satisfactorily although it may be given a better airfoil form as indicated by the dot-dash lines at 19' if desired. One or more rigid ski braces 21 are pivotally connected between the ski and the top plate 18, the number depending upon the total length fore and aft of the hull or pontoon. A suitable construction of such a brace is shown more clearly in FIG. 4 as comprising pairs of parallel braces 21a near each side of the hull connected by cross bracing 21b and suspended between upper and lower pivot pins 22 and 23 respectively which are mounted for swinging movement in suitable brackets 24 connected to the top plate 18 and to the bottom ski 17.

The sides 25 of the pontoon or hull are closed in an air tight manner by a foldable structure, that shown in the drawings representing a rubberized nylon fabric which is impervious to air. This fabric completely closes the sides of the pontoon or hull between the top plate 18 and the bottom ski 17 and is sealed in an air-tight manner along the entire contacting surfaces where the material 25 is fastened to the top and bottom members. It should be understood that folding sides of aluminum, plywood or fiber glass impregnated material might be designed in place of the flexible sides 25 above described.

Suitable means is provided for inflating and deflating the hull or pontoon 16. At 26 in FIG. 1 I have indicated a suitable pump which might be a connection with the supercharger of the airplane engine with suitable valving connected by a conduit 27 with the interior of the pontoon 16. This pumping device is arranged to be valved in the direction of inflating the pontoon 16 by pumping air into the same until it takes the position shown in full lines in FIG. 1 which is a water engaging position spaced beneath the airfoil undersurface of the fuselage of the aircraft. When the pontoon is not in use, then the valving connecting 27 with 26 will be set in the position to suck the air out of the interior of the pontoon 16 as by connecting 27 to the intake side of the engine supercharger. This creates a vacuum within the inflatable hull or pontoon 16 so that the same is retracted to the broken line position shown in FIG. 1 with the braces 21 folding up parallel to the top plate 18 and with the bottom ski 17 in the completely collapsed position coacting with the front end closure 19 to completely close the bottom of the fuselage 11.

A second form of the invention is shown in FIGS. 5, 6 and 7. Here a known type of aircraft having a central fuselage 30 with wings 31 extending outwardly therefrom in opposite directions is provided with any usual means of propelling the same which is not shown in the present drawings as it would only confuse the disclosure of the present invention. It will be understood that the plane is equipped with the usual controls and control surfaces for aircraft of this type.

In this case, the present invention provides two inflatable hulls or pontoons 32, spaced respectively on opposite sides of the fuselage 30. These inflatable pontoons are identical except for their right and left-hand character and one only will be described.

Each of the pontoons has top plate 33 and a bottom ski 34. Each pontoon has a front closure surface 35 and a rear closure surface 36 pivotally connected to 33 and 34. The sides of each hull are closed in an airtight impervious and flexible manner as indicated at 37. It should be understood that the parts 33, 34, 35, 36 and 37 are of similar materials and structure to that already described in connection with the parts 17, 18, 20 and 25 of the first described form. Preferably, a plurality of ski braces 38 of rigid character are pivotally connected between the top plate 33 and the bottom ski 34 as indicated in FIG. 6.

Means is provided for suspending each of the hulls or pontoons 32 rigidly in spaced relation beneath the aircraft as shown in full lines in FIGS. 5 and 6 and for folding the same inside the airfoil surfaces of the aircraft when desired as shown in broken lines in FIGS. 5 and 6.

To this end, each pontoon is rigidly supported by one or more tubular struts 39 pivotally connected at 40 to the interior bracing structure of one of the wings 31. An hydraulic jack device 41 is pivotally mounted at 42 in the structure of the aircraft and is provided with a double acting piston 43, whose piston rod 44 is pivotally connected at 45 to the associated strut 39. Combined inlets and outlets for hydraulic fluid 46 and 47 are provided at opposite ends of the hydraulic device 41 with suitable valving under the control of the pilot of the aircraft. It is obvious that fluid entering at 47 and discharging at 46 will propel the parts of the full line position of FIG. 5 while the opposite flow of fluid will move the parts into the broken line position of FIG. 5. It will be understood that the hydraulic circuit between 46 and 47 is closed in any actuated position of the parts controlled thereby so that the hydraulic fluid trapped in the cylinder portion of the jack 41 will hold the piston and piston rod 44 in any position to which it has been moved. Therefore, in the full line position of the parts in FIG. 5, the hulls or pontoons 32 are held rigid in spaced relation to the aircraft vehicle and, when the pontoons are collapsed and moved up into the fuselage as shown in broken lines in FIG. 5, then again the hydraulic jacks 41 will hold the equipment safely within the fuselage during operation of the plane.

Means is provided for folding the pontoons 32 relative to the supporting strut 39 for easier storage of the same when not in use. To this end, each pontoon has its top plate 33 pivotally connected at 48 to the lower end of the tubular strut 39. A two-way acting hydraulic jack 49 is pivotally mounted to the strut 39 at 50 and has a piston and piston rod 51 pivotally connected to the associated top plate 33 at 52. Hydraulic pressure fluid is supplied to the hydraulic jack 49 preferably through the pivot point 50 as by connecting a hose leading to a source of hydraulic pressure or by bringing the hydraulic pressure through the hollow tubular strut 39 to the point 50. Valve means, not shown, is provided close to the point 50 for controlling flow into and out of opposite ends of the jack 49. As an aid to this control of the pressure fluid, an outside passageway 49a is fastened to the jack cylinder with ports at its opposite ends so that a suitable valve under remote control by the pilot may be utilized to introduce pressure fluid at either end of the jack 49 and discharge the same at the opposite end.

When the piston rod is fully extended, the pontoons 32 are in the full line position of FIG. 5 and rigidly held there by hydraulic fluid trapped in the jack 49. When it is desired to fold the pontoons into the fuselage of the plane, the pontoons are first deflated and then in their flat condition are rotated approximately ninety degrees to the broken line position of FIG. 5 where they are approximately parallel to the supporting struts 39. Then, when the jacks 41 move the struts 39 to the broken line position of FIG. 5, in the direction of the dot-dash arrows of FIG. 5, the collapsed pontoons 32 will be stored in the broken line position of FIG. 5.

Any suitable means may be provided for inflating and deflating the pontoons 32. I have shown at 53 a suitable air pump which could be connected with the supercharger of the plane or it could be a separate pump. This is connected by lines 54 to the hollow central portion of the associated struts 39 through the connection points 40. At their lower ends, the struts 39 are connected by suitable fittings through the pivot points 48 with the interior of the two pontoons 32. Then, by valving not shown, the pilot may send air under pressure through these connections to inflate the pontoons to any desired pressure during use of the pontoons for supporting the plane on the surface of a body of water. When it is desired to collapse the pontoons, then the connections just mentioned between the pump 53 and the pontoons 32 may be reversed so as to cause a suction in the pontoons causing them to collapse to a flattened condition as shown in broken lines in FIG. 5.

It will be noted that when the collapsed pontoons of FIG. 5 are drawn up into the body of the plane, they have an airfoil compatability with the airfoil surfaces of the plane in that they do not interfere with the passage of the plane through the air.

Referring to FIG. 6, if the length of the pontoon 32 requires it, a plurality of jacks 41 and 49 may be provided for each pontoon and the connections for operating all jacks 41 or all jacks 49 would be made in parallel so that they operated in unison. Here again, for additional strength, a separate strut 39a is mounted on a pivot 40a in line with the pivots 40 and connected to the pontoon on a pivot point 48a in line with the pivot 48. The bracing strut 55 is merely to hold the parts so that they act in unison.

Note that the struts 21 of FIG. 1 and struts 38 of FIG. 6 are in a parallel ruler arrangement, that is, the struts are rigid and pivotally connected at their opposite ends to the top and bottom of the hull so that the bottom, during its movement, is always held parallel to the top.

It should be understood that this invention has its greatest use on aircraft which are normally land based. To this end, the aircraft shown here would normally be equipped with wheels but such wheels and landing gear have been omitted from the present drawings in order to not confuse the disclosure. In addition to the above, however, rotatable wheels might be mounted upon the ski 17 of the first described embodiment or on the skis 34 of the second described embodiment.

All surfaces in contact with water or air are to be shaped in conformance with latest hydrodynamic practice.

What is claimed is:

1. In combination with an airborne vehicle having an airfoil surface on the normal underside thereof, a gas inflatable hull having means connecting it with said vehicle, means for inflating said hull and extending it into water engaging position spaced beneath said airfoil surface, said hull having a rigid ski-type lower surface, means for collapsing said hull and retracting it to said airfoil surface, and said hull in collapsed condition having airfoil compatability with said airfoil surface.

2. The combination of claim 1, including rigid braces having their opposite ends pivotally connected respectively with said rigid lower surface and said vehicle in a parallel ruler arrangement.

3. The combination of claim 1 wherein there are two of said hulls separate from said vehicle and in use located respectively laterally on opposite sides of the vehicle fuselage, and means for holding said hulls rigid in spaced relation to said vehicle including rigid struts pivotally connected with said vehicle and movable to fold said hulls into the fuselage of said vehicle, and power means for controlling said struts.

References Cited by the Examiner

UNITED STATES PATENTS

| | | | |
|---|---|---|---|
| 2,306,269 | 12/1942 | King | 244—105 |
| 2,391,326 | 12/1945 | McKinley | 244—105 |
| 3,029,046 | 4/1962 | Blaes et al. | 244—105 |
| 3,190,587 | 6/1965 | Fries | 244—106 |

FOREIGN PATENTS 941,135    6/1948    France.

MILTON BUCHLER, *Primary Examiner.*

L. C. HALL, *Assistant Examiner.*